(12) United States Patent
Faessler et al.

(10) Patent No.: US 9,908,183 B2
(45) Date of Patent: Mar. 6, 2018

(54) DEBURRING TOOL FOR DEBURRING IN PARTICULAR NON-ROUND RECESSES IN WORKPIECES

(71) Applicant: Heule Werkzeug AG, Balgach (CH)

(72) Inventors: Roman Faessler, Marbach (CH); Heinrich Heule, Au (CH)

(73) Assignee: Heule Werkzeug AG, Balgach (CH)

( * ) Notice: Subject to any disclaimer, the term of this patent is extended or adjusted under 35 U.S.C. 154(b) by 310 days.

(21) Appl. No.: 14/384,019

(22) PCT Filed: Mar. 14, 2013

(86) PCT No.: PCT/EP2013/000763
§ 371 (c)(1),
(2) Date: Sep. 9, 2014

(87) PCT Pub. No.: WO2013/135383
PCT Pub. Date: Sep. 19, 2013

(65) Prior Publication Data
US 2015/0063933 A1    Mar. 5, 2015

(30) Foreign Application Priority Data
Mar. 14, 2012 (DE) .................. 10 2012 005 246

(51) Int. Cl.
*B23B 51/00* (2006.01)
*B23B 51/10* (2006.01)
*B23D 79/02* (2006.01)

(52) U.S. Cl.
CPC .......... *B23B 51/101* (2013.01); *B23D 79/023* (2013.01); *B23B 2251/50* (2013.01);
(Continued)

(58) Field of Classification Search
CPC ................ Y10T 408/83; Y10T 408/85; Y10T 408/8583; Y10T 408/85837;
(Continued)

(56) References Cited

U.S. PATENT DOCUMENTS 2,657,597 A    11/1953  Pickering et al.
2,745,299 A  *  5/1956  Fried ..................... B23B 51/102
                                                      408/180
(Continued)

FOREIGN PATENT DOCUMENTS

DE    2223696 A1    11/1973
DE    2407269 A1     8/1975
(Continued)

OTHER PUBLICATIONS

Machine Translation EP 1839788 A1, pp. 7-13, Feb. 1, 2017.*
(Continued)

*Primary Examiner* — Daniel Howell
*Assistant Examiner* — Nicole N Ramos
(74) *Attorney, Agent, or Firm* — Wood Herron & Evans LLP

(57) ABSTRACT

The invention relates to a deburring tool for deburring edges (1, 1*a*, 1*b*), of any desired shape, of recesses in workpieces (19) using at least one cutting blade (2, 2*a*, 2*b*, 2'), wherein the deburring tool is in the form of a slotting and/or drawings tool which is rotated incrementally about its longitudinal axis and is driven displaceably in an oscillating manner in the direction of its longitudinal axis.

15 Claims, 7 Drawing Sheets

(52) U.S. Cl.
CPC .......... *Y10T 407/134* (2015.01); *Y10T 407/23* (2015.01); *Y10T 408/03* (2015.01)

(58) Field of Classification Search
CPC ........... Y10T 408/85843; Y10T 408/89; Y10T 408/905; Y10T 408/906; B23B 51/00; B23B 51/10; B23B 51/101; B23B 2251/50; B23B 29/034
See application file for complete search history.

(56) References Cited

U.S. PATENT DOCUMENTS

| | | | | |
|---|---|---|---|---|
| 2,855,812 | A * | 10/1958 | Fried | B23B 51/101 408/153 |
| 3,017,791 | A * | 1/1962 | Fried | B23B 29/03453 408/180 |
| 3,693,499 | A * | 9/1972 | Ingham | B23D 5/02 409/304 |
| 3,720,477 | A * | 3/1973 | Rusin | B23B 51/10 408/226 |
| 4,086,018 | A * | 4/1978 | Robinson | B23B 51/101 408/147 |
| 4,411,324 | A * | 10/1983 | Liebig | E21B 10/32 166/55.7 |
| 5,181,810 | A * | 1/1993 | Heule | B23B 51/102 408/147 |
| 5,209,617 | A * | 5/1993 | Heule | B23B 51/102 408/154 |
| 6,533,505 | B1 * | 3/2003 | Robinson | B23B 51/101 408/1 R |
| 7,364,389 | B2 * | 4/2008 | Robinson | B23B 29/034 408/156 |
| 8,292,553 | B2 * | 10/2012 | Robinson | B23B 51/101 408/156 |
| 8,696,266 | B2 * | 4/2014 | Beier | B23B 51/101 408/147 |
| 2006/0291967 | A1 | 12/2006 | Heule | |
| 2010/0077895 | A1 | 4/2010 | Beier | |
| 2011/0052339 | A1 * | 3/2011 | Burr | B23B 51/101 408/181 |

FOREIGN PATENT DOCUMENTS

| | | | |
|---|---|---|---|
| DE | 4307084 A1 | 9/1994 | |
| DE | 10215004 A1 | 10/2003 | |
| DE | 102007020207 A1 | 10/2008 | |
| EP | 1839788 A1 * | 10/2007 | ............. B23B 1/101 |
| JP | 58132407 A * | 8/1983 | ............... B23C 3/34 |
| JP | 1992082607 | 3/1992 | |
| JP | 1999512979 | 9/1999 | |
| JP | 2007506560 | 3/2007 | |
| JP | 2010515587 | 5/2010 | |
| WO | 2008083646 A2 | 7/2008 | |

OTHER PUBLICATIONS

European Patent Office; Search Report/Written Opinion in International Patent Application No. PCT/EP2013/000763 dated Jul. 30, 2013; 13 pages.

German Patent Office; Search Report in German Patent Application No. 10 2012 005 246.4 dated Sep. 9, 2012; 4 pages.

Examination Report, corresponding Korean Application No. 055615500, dated Aug. 1, 2016.

Japanese Search Report, corresponding JP Patent Application No. 2014-561322, dated Dec. 20, 2016, pp. 1-4.

* cited by examiner

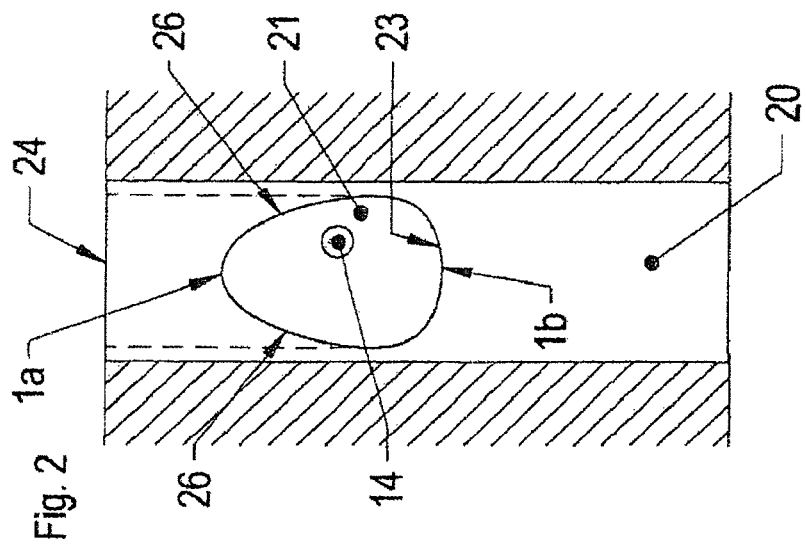
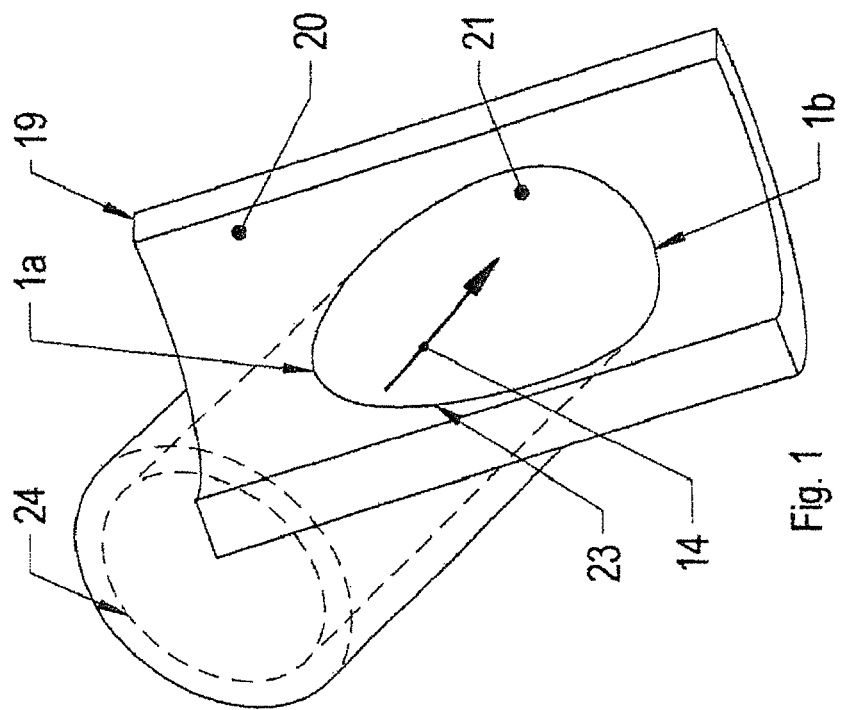

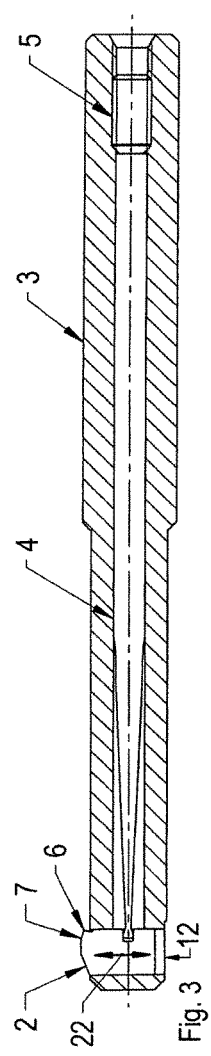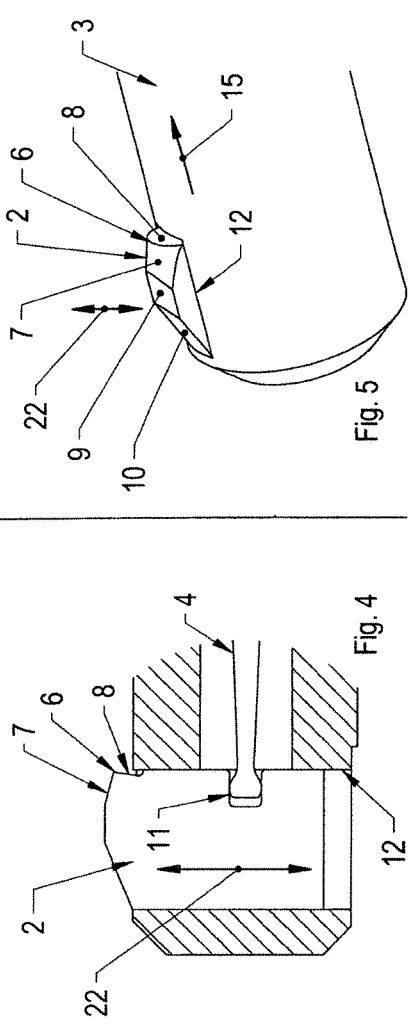

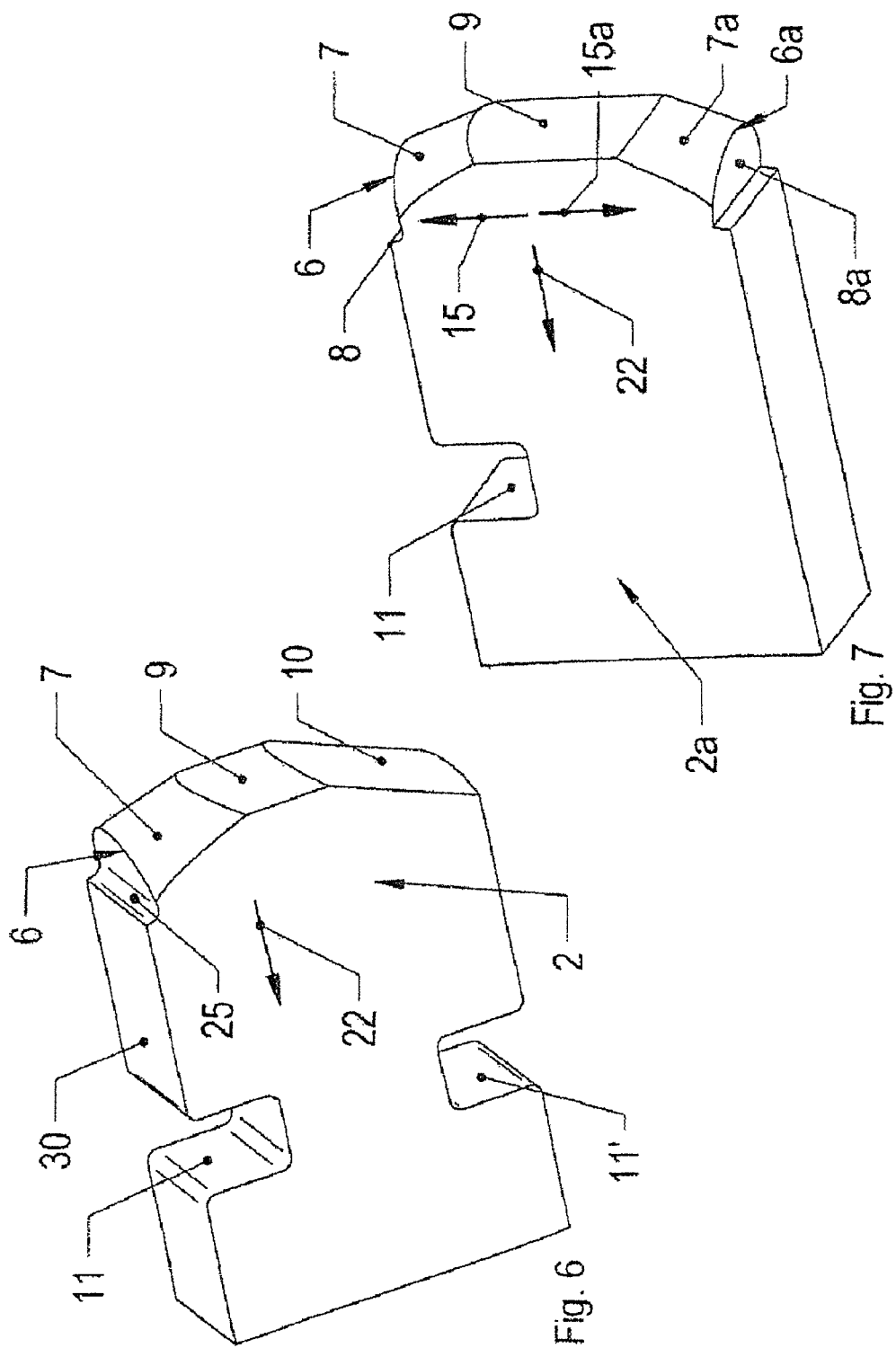

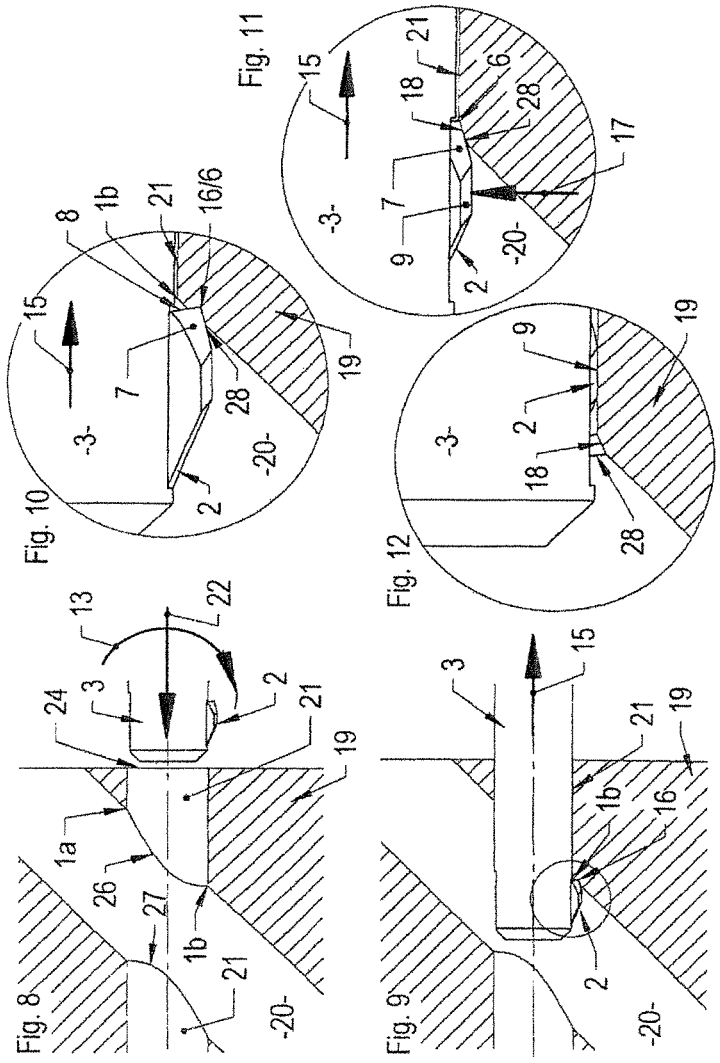

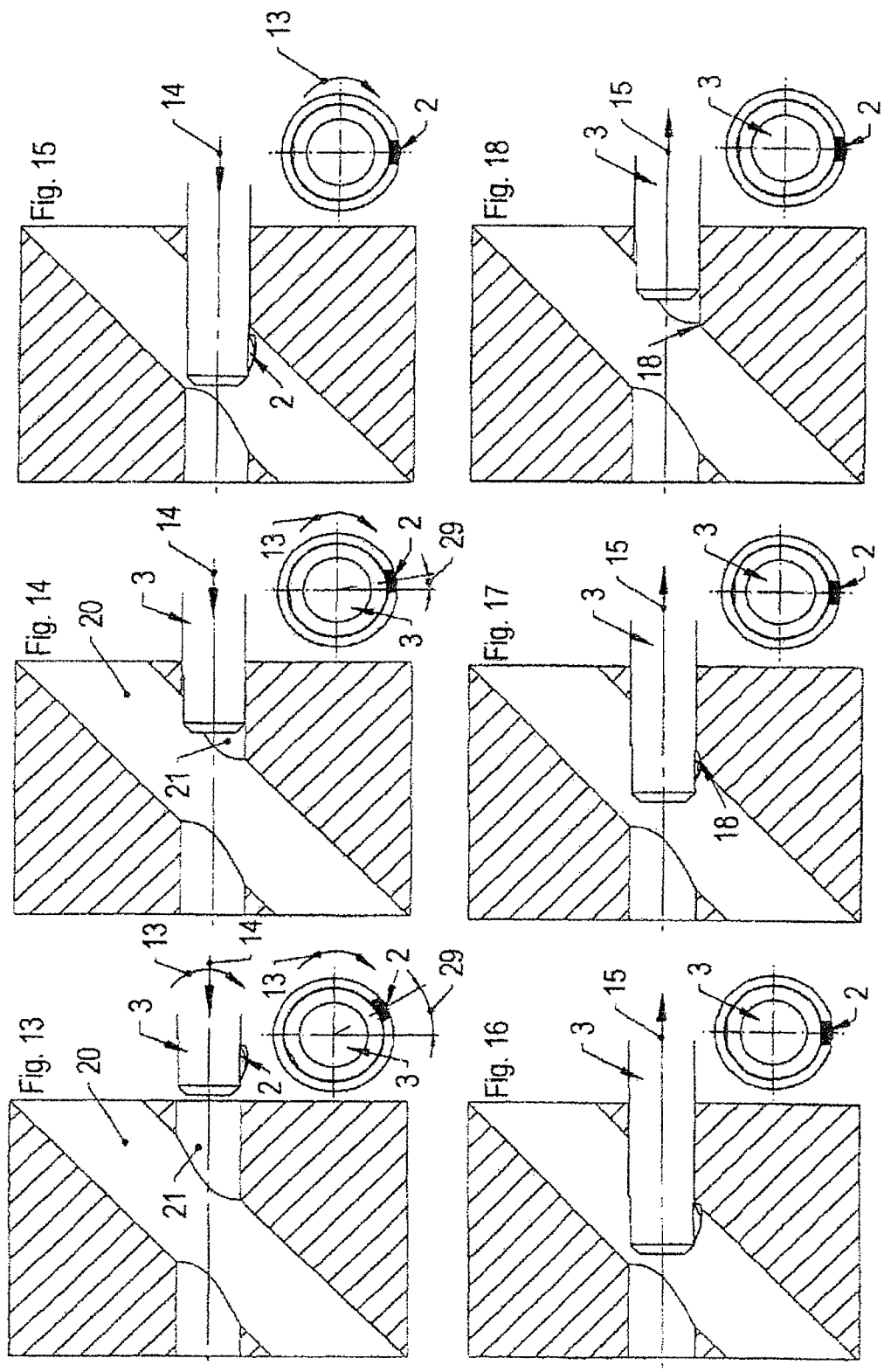

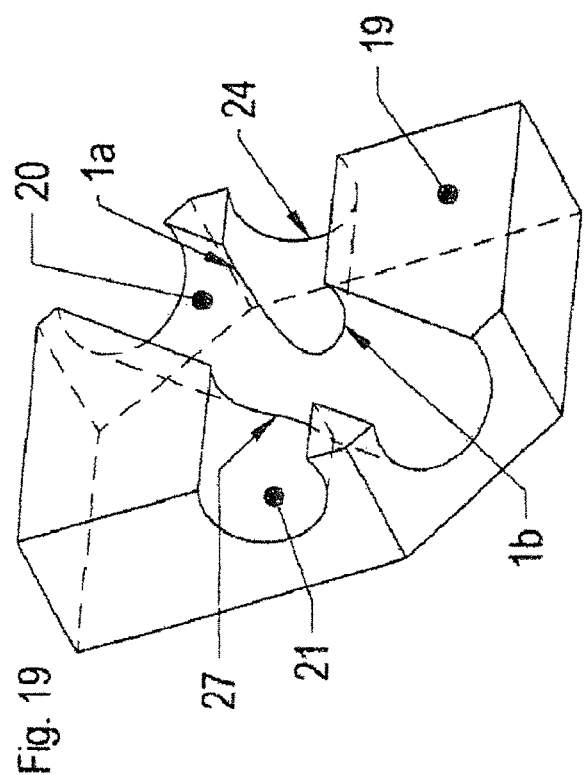
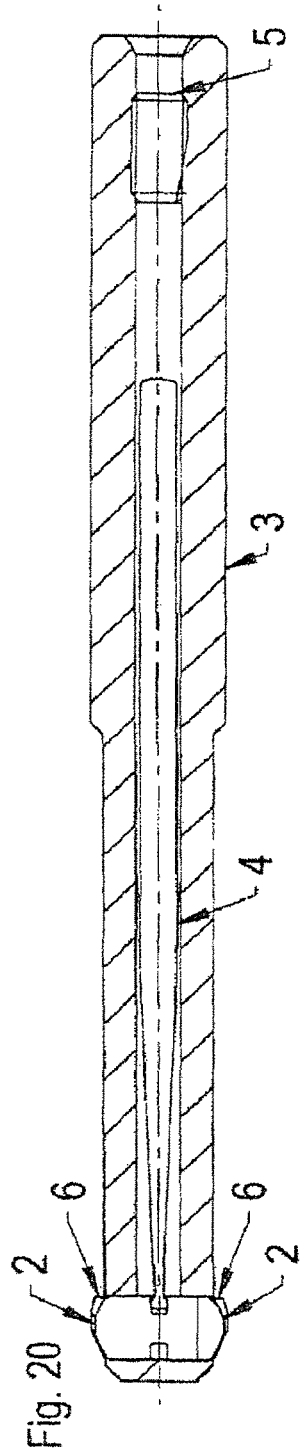

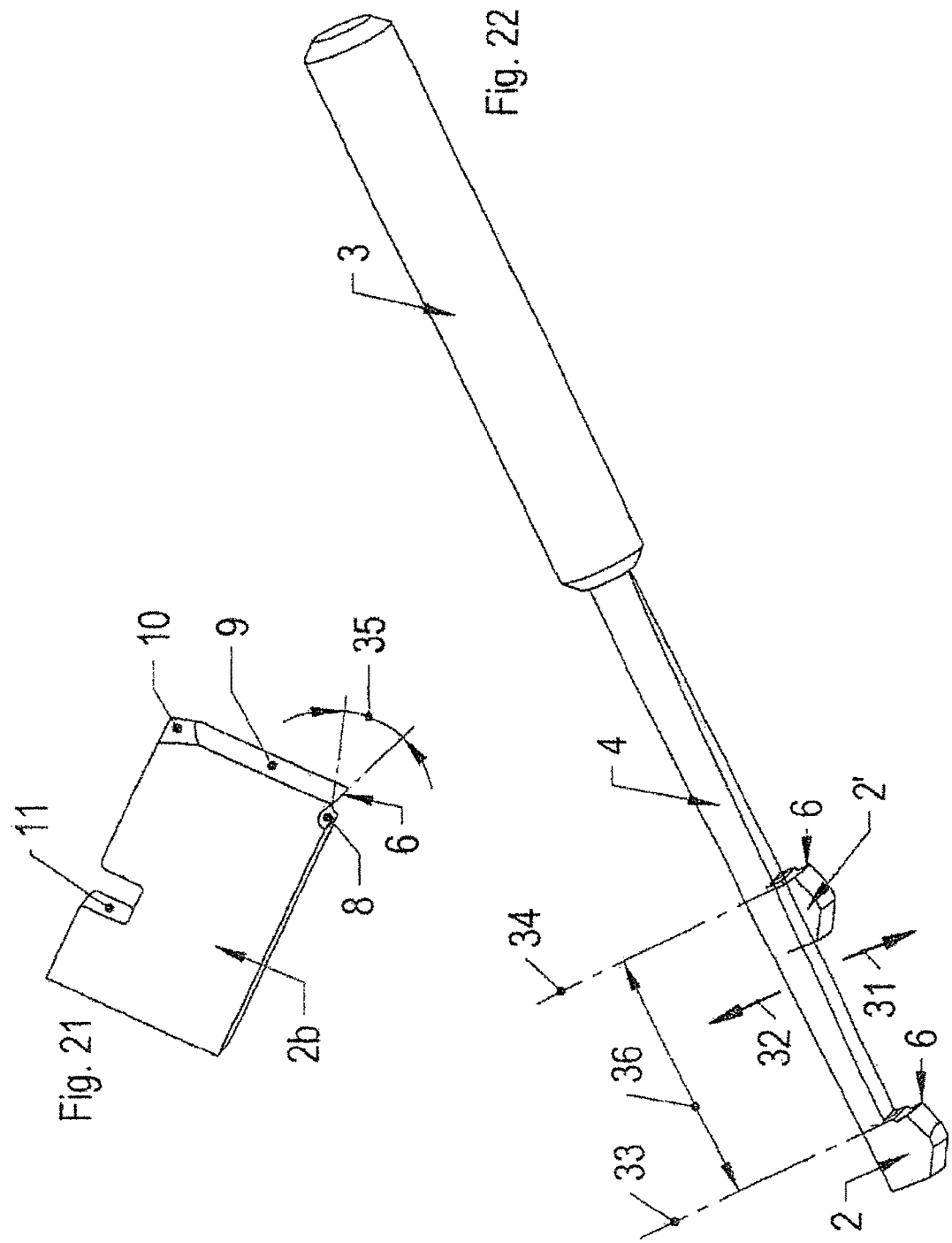

DEBURRING TOOL FOR DEBURRING IN PARTICULAR NON-ROUND RECESSES IN WORKPIECES

The invention relates to a deburring tool for deburring any shape of edges of openings in workpieces and a process for operating a deburring tool and a blade attached to the deburring tool.

Until now, it is only known that non-circular openings or uneven outlet edges of holes can be freed of the burrs, which form in processing, by removing them with a brush or with a drill. However, there are problems especially when intersecting holes are present, for example. These intersecting holes can form a non-circular section opening in the shape of a drop or an olive for example.

Intersecting lubricant holes e.g. in crankshafts, are managed by inserting a broach in the non-circular opening resulting from the combination of the holes to completely remove the burrs formed there as far as possible. It is also known that brush tools can be used to remove the burr from the non-circular, varying hole edges. However it has become clear that removing burrs in this way is difficult and uncertain. Indeed, the use of the tools cannot ensure that the entire hole edge is chamfered equally and all the burrs at the hole edge are removed.

As long as brush tools are used, it is not possible to remove the root of the burrs as the brushes work flexibly and are not able to undertake the reliable and complete processing of the hole edges.

Therefore the invention forms the basis for providing a deburring tool for deburring the edges of any shape of openings, particularly of non-circular openings, e.g. intersecting hole channels whereby an effective processing of the entire edge can be done in the form of a cutting process.

For fulfilling the set task, the invention is characterized by the technical teaching of Claim 1.

An important feature of the invention is that the deburring tool is designed as a stepwise pulling and pushing tool which rotates on its longitudinal axis and can be moved in the direction of its longitudinal axis in an oscillating manner. It is equipped with at least one movable or swiveling blade under spring load transverse to the longitudinal axis of the deburring tool, which carries out a cutting-shaping of the edge of the non-circular opening. Up until now it was only known that approximately round openings in workpieces are cut-processed by rotating, driven deburring tools.

With an old patent application of the same applicant, it is also known that a so called "Wobbei" tool can be used. This makes it possible to scan hole edge and, depending on the scanning, a positively controlled feed motion of the deburring blade takes place in rotating operation.

However it was found that the expense associated with it for positively controlling the deburring blade and for scanning the hole edge, was disproportionately high and an adequate deburring effect cannot be guaranteed.

Special difficulties arise if the deburring of hole channels in the intersecting angles is involved, e.g. with angles of 120, 150 or 170 degrees. The intersections formed there produce non-circular openings which can no longer be deburred completely and neatly with rotating cutting tools.

This is where the invention comes into play. Instead of a rotating cutting tool, it suggests the use of a deburring tool working in a pulling or pushing operation. This means that after the first embodiment, the (cutting) deburring action of the inventive tool in the forward stroke (i.e. in the direction of the longitudinal axis of the main casting of the deburring tool), takes place when it dives into the hole or in the opening of the workpiece.

Another structure can be designed in such a way that at least one inventive blade of the deburring tool takes up the deburring for the non-circular edges of the opening in reverse operation, i.e. in the pulling operation.

A third arrangement is designed in such a way that (at least) a double sided blade is arranged in the deburring tool which is able to carry out a deburring in the pulling and pushing operation.

Such a deburring in the pulling and pushing operation, as per the third design, is most effective if the cutting holes aligned at the other side of the cutting site continue under the formation of non-circular opening. This enables the deburring tool to deburr the hole edge when entering the hole in the push operation and when advancing it deburrs other aligned edges of the opening, which are on opposite sides.

Due to the simple description, it can be assumed that deburring of non-circular holes edges must be carried out. However, the invention is not restricted to this. The inventive tool, the procedure used for this and the deburring blade claimed with a object of the patent can be used for deburring any shapes of edges of any opening forms thus also round openings.

It is possible to deburr not only the openings of hole edges and intersecting holes in workpieces of any kind, but also semi-circular, oval, partial or oblong openings or holes that are halved. Halved holes have material only on one side, which has to be deburred, whereas on the other side the material is missing completely and a deburring action can be canceled due to missing material on this side.

Of course, any multi-edge holes can be deburred, so that only the simpler version of the following description of the deburring, deburring of a non-circular hole edge is assumed even though the invention is not restricted to this.

The deburring tool that is the object of the invention thus does resort to the scanning of the edge of the opening and a positively driven operation of one of the several blades derived from that as it is known in the best available technology. Instead, the invention assumes that a suitable machine-controlled guide tool is available and in its clamping jaw or in general in its fixing device, the main casting of the deburring tool is clamped and in the X and Y direction the deburring tool is operated along the edge of the opening defined in the X and Y level (e.g. non-circular). Thereby, it is assumed that the workpiece is clamped in a stationary position.

Even the kinematic reversal is possible, i.e. the deburring tool is clamped in a stationary position and the workpiece to be deburred is guided in a X and Y level along the opening edge in this level.

In both cases, the deburring tool (or kinematically reverse: the workpiece) goes in the oscillating direction of movement directed into the Z-axis, guided parallel to the longitudinal axis of the deburring tool. Thus, the push or pull action of one or more blades is carried out on the edge of the opening.

In both cases the deburring tool (or kinematically reverse: the workpiece) goes into the rotating movement divided into index steps, directed along the longitudinal axis of the main casting (approximately following a peripheral line on the main casting). Thus, the blade present earlier in the cutting contact to a specific position of the edge of the opening is moved and/or rotated further till the adjacent position of the edge of the opening for the next cutting contact (by an index rotating step).

The deburring tool is shifted if an oval-shaped hole needs to be deburred instead of a round cylindrical hole. In this case, it is required a deburring tool driven in a rotating manner along its longitudinal axis stepwise, which causes an additional lateral movement perpendicular to the oscillating displacement axis.

The invention is not restricted to only one single blade fitted to the main casting of the deburring tool. Another model of the tool has a provision of having more than one blade. For instance, it is possible to use two blades lying opposite to each other at the circumference of the tool or three or more blades placed at equal distances at the circumference, which do not lie just on a single circumference level. They can even be on different, consecutively arranged peripheral lines.

Only due to the simpler description, it is assumed a single spring blade that can be moved radially in the main casting, although the invention is not only restricted to it.

In view of the springs used for the radial spring suspension of the blade, any spring can be used, e.g. a helical compression spring, salient compression spring, spiral spring, elastomer spring, leaf spring and any other spring mechanism, which can manage to radially move or swivel one or more blades from the blade window of the main casting of the deburring tool.

The invention is not only restricted to a radial displacement of one or more blades from the blade window of the main casting. In another design, swiveling movements can be intended for one or more blades, which are thus not moved in or out radially from the blade window, but swiveled either into the blade body over the swiveling axis of the main casting or out of the blade window.

Even here, the aforementioned spring mechanism is used and it is possible for all the springs to facilitate the managements of such a spring-loaded swiveling movement out of the blade body or into the blade body against the force of the spring.

For this reason, it is necessary that one or more deburring blades are pretensioned in the direction of displacing transverse to the longitudinal axis of the main casting, spring-loaded in the outward direction.

Due to the simpler description, in the following description it is assumed that the deburring tool works in the pulling mode, although, as shown above, the deburring tool can also work in the pushing and/or pulling mode.

Such a pulling action is described below due to the simpler description.

1. In the first step of the procedure, the deburring tool dips into the bore or the opening, whose edge needs to be deburred, using the spring-loaded blade moved out from the main casting.

2. The deburring tool pushes into the inner surface of the hole at the feeding end (in general: into the inner circumference of the feeding channel), at which point the blade is pushed inside the main casting in a spring-loaded manner and travels through the hole in this neutral position together with the main casting.

3. When it comes out of the borehole or cuts of any shapes, the blade moves or swings outside under the spring load over the outer area of main casting of the deburring tool and reaches the edge of the irregular cut that needs to be deburred.

4. The deburring tool then moves back in the pulling direction as compared to the previous feeding movement.

5. The movement directed backwards takes place preferably in one single pull, where the blade first "bites into" the workpiece material at the hole rim using its cutting edge at the start of the deburring process.

6. With the further gradual backward movement, the blade—under the influence of the control surface on the blade to be described later—is pushed in the inner area of the base body against the spring load or load of energy store. The subsequent machining movement carries out the deburring of the cut edges when the deburring tool moves back in the main casting, wherein the chip separated by the blade cutting edge from the rim of the opening, is set apart and removed from the chip guiding level.

7. After the complete separation of the blade from the edge of the cut, the blade moves back to a neutral, non-cutting position in the base body along the load of energy store and the entire base body is thus moved in drawing direction in the borehole.

8. Next is the rotation of the deburring tool by the indexing angle along its longitudinal axis. It is not necessary here that the deburring tool comes out completely of the hole during the return stroke for this purpose.

When in neutral, the blade can also rotate at a specific index angle of, for example, 0.5 to 2 degrees rotation angle around its range, non-cutting position of one or more blades in the borehole and then it goes into the hole in the pushing direction.

The same process as described in Clause 2 and 3 is repeated. As the deburring tool has been rotated by the index angle in the direction of the circumference, the second chip adjacent to the first chip is cut off from the rim of the opening.

The index movements of the rotation of the main casting in the direction of the peripheral line are designed so that (for the rim of the opening to be deburred) adjacent, separated chips overlap on the other side. Thereby, the hole rim is completely free of any sharp edges or cuts and is thus deburred completely smooth and uniform.

The reference is to the fact that only because of the simplicity, such a deburring tool has been described for the use as a pulling tool. There is no representation of the fact that the previously described pulling tool can go through the through hole in such a way to be able to deburr the uneven rim of the opening lying opposite to the side of the hole. In this case, the blade works in the pulling as well as in the pushing mode.

The invention is not restricted to a fixed main casting of the deburring tool, which is specially designed as cylindrical. In another design, the main casting can be designed as a leaf spring having at least one blade attached to its front, free and swiveling end.

Obviously, even multiple blades can be attached to it and even multiple leaf springs separated from each other can be used, where each leaf spring has a suitable blade attached to its front free end.

The object of this invention does not result only from the object of the individual patent claims, but from the several combinations of individual patent claims as well.

All the details and features specified in all documents, including the summary, especially the spatial development shown in the drawings are considered as essential to the invention, provided that they are individually or in combination new to the state of art.

Below, the invention is described more in detail with the help of as-built drawings. Other features and advantages of the invention essential for the invention are evinced from the drawings and their description.

They show the following:

FIG. 1: Section through two crossing holes with a resulting miscut hole rim/edge, which needs to be deburred.

FIG. 2: The top view of the resulting miscut hole rim.

FIG. 3: Cut by a first embodiment of a deburring tool according to the invention.

FIG. 4: The detail view of the front side of the deburring tool after FIG. 3.

FIG. 5: A perspective representation of the front end of the deburring tool after FIGS. 3 and 4.

FIG. 6: The perspective representation of a first embodiment of a blade that operates in the pulling mode.

FIG. 7: A second embodiment of a blade that operates in the pull and push mode.

FIG. 8: The first operating step for a deburring blade in the pulling mode, if it has not yet entered into the hole.

FIG. 9: The procedure step following FIG. 8 when the blade deburrs for the first time in the pulling mode.

FIG. 10: A detailed representation of FIG. 9 with representation of the first contact of the blade on the hole rim.

FIG. 11: Continuation of the representation after FIG. 10 when the blade is spring-loaded and enters into the main casting and carries out simultaneous machining of the hole rim.

FIG. 12: The continuing work process after FIG. 11 when the blade is spring-loaded and has entered into the main casting and rest neutrally inside the hole.

FIGS. 13-18: Chronological progress during deburring of an uneven hole rim using the pulling tool as per the invention.

FIG. 19: Perspective representation of the cutting hole channels in a representation similar to FIG. 1.

FIG. 20: Cut by another embodiment of the deburring tool having two blades in opposite directions.

FIG. 21: The representation of a blade without a control surface as compared to FIG. 6 or 7.

FIG. 22: Another embodiment for a deburring tool which works exclusively with one or several leaf springs.

FIGS. 1 and 2 show that two holes cut in an angle of 45 degrees for example, namely, the longitudinal hole 20 and the cross hole 21, produce an intersection in the cutting section, whose edge to be deburred is olive shaped or drop shaped as per FIG. 2.

Beveled bore edge 1 produced in the range of this opening must be deburred to its full circumference.

Hence the upper beveled bore edge 1a as well as the lower beveled bore edge 1b are finished and cut completely without breaking it.

Both these holes 20 and 21 are arranged in a workpiece 19 where the type and material selection of the workpiece 19 does not play a role in the invention. Workpiece 19 can consist of a metal material but it can also have a plastic, wood or any composite material.

In the range of the cross hole 21, a hole inlet 24 and a hole outlet 23 are produced. The hole outlet 23 defines the upper and lower beveled bore edge 1a and 1b.

The inventive slotting tool or draw plate appears from the cross hole 21 upwards in the direction of the arrow 14 to the plane of the paper according to FIG. 2. It then comes out in the type to be described later as one or several spring-loaded blades.

The lateral surfaces from the bore outlet 23 and the bore inlet 24 are defined by the lateral bore trailing edge 26.

FIG. 3 shows a first embodiment of the inventive slotting tool or draw plate, which is also commonly known as deburring tool. It consists of a somewhat cylindrical main casting 3, whose front extremity can be reduced in diameter.

In the longitudinal hole in the interior of the main casting 3, the extremity of a spring 4 is fixed with a clamping screw 5. Spring 4 is designed as a flexible spring clamped at one side.

It also works as a leaf spring. It can also be in the form of a rod clamped at one side or with eccentric cross section.

The clamping screw 5 prevents the spring 4 from falling out backwards from the longitudinal hole in the main casting.

The spring force of the spring 4 can be adjusted with the adjustment tool, which is not described in detail.

According to FIG. 4, the front free and springy extremity of a spring 4 intersects a blade groove 11 at the base of blade 2 and it is positioned there in a swiveling setting.

FIG. 4 shows the basic division or the division of work of the deburring tool, in which the blade 2 with its cutting edge 6 arranged at the back, is exposed from the blade window 12 of the main casting 3. The blade edge 6 is transferred to the cutting face 8, which is bent for blade edge (and which is described later) and on the other side of the blade edge 6 (again in a particular angle to this) a control surface 7 is provided for controlling the displacement of blade 2.

Further details can be seen in FIG. 5. Here it is possible to see that the blade edge 6 has an arc-like shape and the only cutting edge of the blade is cutting edge 6, which is then transferred in the backward working direction 15 (direction of pull) in a subsequent concave cutting face 8.

FIG. 6 shows how the concave cutting face 8 is transferred through a chip-flute 25 to a neutral surface 30.

Of course, the invention is not limited to a concave, arc-shaped formation of the cutting face 8. The cutting face 8 is only used for chip removal of the cut blade and for continuing in the proximity of the main casting 3. Instead of a concave chip-flute 25, it can also be envisaged straight formed (i.e. beveled) but straightened chip-flutes 25.

On the other side of cutting face 8 and beyond the cutting edge 6, a control surface 7 attaches to the cutting edge 6 whose function is described subsequently. A sliding surface 9 attaches to this control surface 7. The sliding surface is transferred in the insertion surface 10 and is used as a lead-in chamfer for blade 2 when it is inserted in the hole.

The working direction (direction of pull) is marked with the direction of the arrow 15 in FIG. 5, and it is visible that the spring-loaded blade 2 protrudes under the effect of the spring 4 from the blade window 12 as shown in FIG. 5. This is the working position of the blade in which the cutting edge 6 is meshed with the opening edge to be processed.

FIG. 6 shows further details of the blade 2 shown in FIGS. 4 and 5 which is suitable only for the pulling operation. Here it can be observed that for the meshing of the front end of the spring 4, a blade groove 11 inserted deeply in the blade is to be envisaged.

A radial shifting motion takes place under the load of the front end of the spring 4 in the marked direction of the arrow 22 outwards or against the force of this spring 4, inwards into the blade window 12.

FIG. 7 shows a double sided blade 2a where, with respect to symmetry, the front side of the front center is arranged mirror-symmetrically with opposite cutting edges 6, 6a and every cutting edge 6, 6a moves to the assigned control surface 7, 7a in a central common slip surface 9.

As described before even the cutting edge 6a is assigned to a cutting face 8a.

As opposed to blade 2, which is suitable only for the pulling operation according to FIG. 6, the blade 2a is suitable for the pulling as well as the pushing operation according to FIG. 7 and it can be used for cutting in both directions.

In addition to this, FIG. 6 shows that a blade 2, which is used for the pulling operation, can also be used at 180 degrees and it can be used in a position of 180 degrees in the blade window 12 of the deburring tool. This means that it is not suitable for the pulling operation but it is for the pushing operation. In this case, the blade groove 11' shown in FIG.

6 is provided so that through selective contact of the front extremity of the spring 4 in the blade groove 11 or 11', the blade can be used either in the working position shown in FIG. 6 or in a position used at 180 degrees in the pushing operation as opposed to FIG. 6.

The blade according to FIG. 7 is designed for the pushing as well as the pulling operation and it can obviously be used for attaching an assigned blade groove 11 at 180 degrees.

The double edged blade 2a shown in FIG. 7 can thus be operated simultaneously also in the operating directions (direction of the arrow 15 and 15a).

FIGS. 8 and 9 show the application of the blade according to FIGS. 4, 5 and 6 in the pulling operation where first the main casting 3 is inserted in the direction of the arrow 22 in the cross hole 21 according to FIG. 8, and it then negotiate the hole inlet 24. When it enters the hole inlet 24, blade 2 is displaced inside because of the spring load on blade 2 in the main casting 3. It is then placed in the main casting in a neutral position so that the blade can pass through the cross hole 21 in this position neutrally until it reaches the position shown in FIG. 9.

There the blade is exposed or swiveled under the load of the spring or another energy storage mechanism radially from the main casting 3 and the deburring action starts as it is explained in detail by FIGS. 10 to 12.

In the first process step, the main casting is withdrawn in the direction of arrow 15 according to FIG. 10 so that the front cutting edge 6 of the blade reaches the first chip or material contact in the form of a material cut 28 with the opening edge. The cutting edge 6 enters only in the form of a material cut 28 in the material of the workpiece 19 and, due to the slanted position of the control surface 7 with reference to the tensile direction 15, there is a force component which works in the radial direction on the blade and works against the spring which keeps the blade under the spring load in an extended position. In this position, the spring load of the spring is overcome, at least to some extent, and the blade begins to move back in the radial direction in the blade window 12 of the main casting 3 according to FIG. 11, where, simultaneously, the cutting action is continued as shown in FIG. 11.

This means that when the blade 2 is pulled in the direction of the arrow 15, simultaneously a vertically aligned swiveling or shifting motion of blade 2 takes place in the blade window 12 of the main casting 3. During this time the material lifting processing takes place in the form of the material cut 28 shown in FIG. 11.

It is important here that the control surface 7 does not cut and follows the cutting edge 6 as well as attaching diagonally to the material cut 28 so that the slant control surface 7 (designed as sloping in the tensile direction) displaces blade 2 in a direction to the longitudinal axis of the pulling movement (happening in vertical direction of arrow 15) in the main casting 3 and the blade cuts here.

Availability of the control surface 7 is not absolutely essential. If the control surface is not applicable, a step is taken with the prerequisite that the cutting edge 6 is arranged diagonally to the tensile direction 15. This means that the control surface 7 can also become inapplicable as shown in FIG. 21 later on. However, if a control surface 7 is present here, a reliable displacement of the blade 2 takes place in the main casting 3 through the blade window 12.

A reliable displacement takes place already through a slanting alignment of the cutting face 8 with respect to the cutting edge 6, where the cutting edge itself does not cut but ensures a particular displacement movement of the blade 2 in the direction perpendicular to the pull movement in the direction of arrow 15.

For an exactly straight cutting face and an exactly straight cutting edge, the blade is operated in a straight cutting movement parallel to the tensile direction and the entire inner circumference of the cross hole 21 is bruised. The chip removal which is done in this manner is formed straight in an undesirable manner and it is not slanting as sought in deburring.

This is prevented with the help of this invention and thus the inventive tool is a deburring tool and not a pulling tool or a broaching tool, which makes straight material cuts and does not make slanting material cuts which only affect the hole edge.

Chip removal that happens in common spaces is also avoided. Such a space is made with common pull broaches that make straight material cuts. The tool however works as a deburring tool where the deburring of a hole edge is done progressively, piece by piece in direction of the circumference.

Following the deburring of the cut edge, according to FIG. 11, the blade goes against the force of spring 4 in the main casting 3 and it reaches the inner circumference of the cross hole 21 in a neutral position where cutting no longer takes place.

According to FIG. 12, in this neutral position the rotating indexing movement takes place around the longitudinal axis of main casting 3. This indexing movement can however also take place in any other positions, namely, always where the blade is not in the cutting contact with the hole edge.

In another embodiment, it is also possible that during the cutting according to FIG. 10, i.e. in the cutting process of the opening edge, also the blade 2 is rotated in indexing motion so that, in this case, a slanting cutting is done at the edge of the hole.

It should be noted that the indexing movement does not only take place in a position shown in FIG. 2, but it can also take place in the position shown in FIG. 9 or FIG. 8.

FIG. 10 also shows that the blade 2, with its cutting edge 6, is firstly found in the material cut 28 of the workpiece 19 of a contact point 16, where the cutting edge 6 clamps in the material of the workpiece, and then it progresses further in the form of a deburred cut or deburring 18. This is shown in the intersection of FIGS. 10 and 11.

The cutting edge, which is somewhat arc-shaped continuously and/or segmented, works in the longitudinal direction and it indicates a subsequent control surface which negotiates the deburring movement in radial direction inwards in the direction of the center axis of the cut and it is restricted in the longitudinal direction.

FIG. 8 shows in general that also a through-hole can be deburred as it can be noticed there that, after the deburring of the through-hole outlet edge 26, also the opposite hole of the cross hole 21 can be deburred with the edge of the hole inlet 27 in the pushing operation. For this purpose, the blade 2a is provided according to FIG. 7.

FIG. 11 shows the displacement movements which take place in the direction of the arrow 17 against the spring force of spring 4 of the blade 2 in the blade window 12 of the main casting 3 in a neutral position.

FIGS. 13 to 18 show the gradual processing of the hole edge of the cross hole 21 in the form of gradual successive indexing movements that take place step by step in the direction of arrow 13. As shown in FIG. 13, in case of the intersection of FIG. 13 to FIG. 14, firstly the blade 2 is rotated from its marked position to a indexing angle 29 in a new position and in this new position blade 2 is inserted in the position as shown according to FIG. 14 in the cross hole 21. FIG. 14 is only an intermediate level between FIG. 13 and FIG. 15 where it is observed that after passing through the hole according to FIG. 14, the main casting 3 is rotated again to another indexing angle and, in this rotated position of the blade, the actual deburring action takes place from FIG. 13 to FIG. 15 as shown in FIG. 16.

FIGS. 16 to 18 thus show the gradual deburring action where one single shaving in the form of a material cut 28 is lifted from the edge of the hole where a shaving length of e.g. 3/10 mm is produced. Here it is assumed that the diameter of the main casting of the deburring tool is 4.8 mm and the cutting edge 6 of the blade 2 has a breadth of 1.2 mm.

After the superimposed deburring cuts are done and the indexing angle 29 is superimposed and do not lie right besides each other, the clamping width is reduced accordingly with a clamping width of, for example, 0.3 mm. The size ratios given here only explain the type and form of a preferred exemplary embodiment. The specified size ratio thus does not restrict the scope of protection of the invention.

The arc-shaped form of the edge 6 of the blade has turned out to be especially advantageous. Trials have shown that the entire arc of the cutting edge 6 does not cut at once. During the gradual deburring at the opening edge only a certain section on the arc shape of the cutting edge is cut and not the entire arc shape due to the non-circular form of the cut.

Instead of an arc-shaped cutting edge 6 also other cutting edge forms are used e.g. oval cutting edge profile, elliptical or polygonal shapes.

Therefore the invention is not restricted to an arc-shaped cutting edge.

FIG. 19 shows a partially cut presentation of the intersecting cross hole and longitudinal holes 20 and 21 in a similar manner as shown in FIG. 1. From this presentation the better intersection of the holes 20 and 21 and the non-circular opening resulting from it must be taken with the beveled bore edge 1, 1a, 1b.

FIG. 20 shows an embodiment modified from FIG. 3 from which it can be observed that, in case of a similar configuration and similar appearance of the deburring tool instead of a one sided blade 2, a double sided blade is used which thus has two opposing cutting edges 6.

Here both halves of both blades of the opposite blades 2.2 may not necessarily be formed symmetrically. It is also not necessary for the solution, but it is preferred if the cutting edges 6 are equally formed.

With such a double edged blade there is an advantage. Respectively one of the two cutting edges 6 can be meshed with the edge of hole 1 when the other cutting edge 6 is inactive.

However if the deburring tool goes back, in this way the edge of the hole, which is formed differently, can be deburred by the opposing cutting edge.

The double edged blade 2.2, shown in FIG. 20, can also carry out different deburring actions in the same return stroke.

Of course, a double edged blade is not restricted to the return stroke in the direction of the arrow 15 (see FIG. 5) rather, such a blade can also be used at 180 degrees and it then has a double effect in the pushing operation where both cutting edges 6.6 are directed forward in the direction opposite to the arrow direction 15 marked in FIG. 5.

The double edged blade 2.2 shown in FIG. 20 can be combined and used with all the embodiments and modifications of all the aforementioned and subsequently mentioned forms.

FIG. 21 shows another blade 2b which is formed in the same way as the blade shown in FIG. 7. Therefore for the same parts the same reference numbers are used. However as opposed to this blade, the control surface 7 attached to the cutting edge 6 according to the figure becomes inapplicable and the cutting edge 6 thus goes directly in the neutral, non cutting slip surface 9.

Only the bevel 35 of the cutting face 8 is used for exercising the displacement force in the direction of the arrow 17 (see FIG. 11) to achieve a displacement of blade 2b in the interior of the blade window 12 for the deburring action, which is shown in FIGS. 9 to 12.

This bevel is joined as shown in clause 28 in FIG. 10 to the material and it slides up on it to displace the entire blade in the direction of the arrow 17 during the material cut in the cut window 12 as explained using FIG. 11.

By comparing the presentation in FIG. 21 with FIG. 6, it is therefore clear that it is not absolutely necessary for the solution that a blade displacement in the direction of arrow 17 of the controlling control surface 7 joins the cutting edge 6. Instead, even bevel 35 of the cutting surface 8 can be used to achieve the same displacement action in the direction of the arrow 17 during the deburring cut according to FIGS. 10 and 11.

FIG. 22 shows a completely different embodiment of a blade wherein all the features of this embodiment can also be used on the aforementioned features and modifications in all the drawings and descriptions.

Characteristic of this embodiment is a deburring tool in which the cylindrical main casting 3 is completely omitted and the spring 4 in the interior of the main casting 3 according to FIG. 3 is free and it is in the form of a spring in the directions of the arrows 31, 32.

This spring 4 works as the spring 4 (described in FIG. 3) as a flexible spring clamped at one side where the main casting 3 is the rear holder of spring 4 from now on and it is formed as a freely swiveling flexible spring.

At the front free and swiveling end of spring 4 formed as a flexible spring, at least one blade 2 is assigned.

Instead of the blade 2 shown here even the blade forms with respect to the blades 2a, 2b and 2' are used.

In addition to this, FIG. 22 shows that it is possible to assign more than one blade to different distances 36 at the spring 4.

The blade 2' shown there is identical to the formation of the aforementioned blade 2, however it is on a length that is different from 33, namely on the length 34, on the spring 4 and it is connected to it. Both positions 33 and 34 are thus separated from each other by the distance 36 and thus it is possible to mesh two different blades 2,2' with two holes that are in succession.

As previously stated, both blades 2,2' can also be replaced by the aforementioned other blade forms with respect to blades 2a, 2b.

Such an embodiment with two successive blades 2,2' can also be avoided in the embodiment shown in FIG. 3. Then it is assumed here that there is another blade window in the main casting 3 behind the front blade window 12 in the distance 36. In the range of this blade window, a blade 2' is allocated which is fixed with the flexible spring 4 in the range of the length 34.

Instead of a freely swiveling flexible spring 4, as shown in FIG. 22, the embodiment can also be assigned with at least two axially consecutive blades 2,2' even to a deburring tool according to FIG. 3.

It is important that the tool does not rotate in an advantageous embodiment, but rather it must deburr with pulling and pushing with its frontal cutting. Here the tool is laterally rounded and rotates for every swing in the preset initial position.

The deburring process can look as follows. The tool appears in the workpiece and it is spring-loaded retracted in the main casting. After the workpiece hole is passed through, the blade retracts again in the preset initial position and it is ready for the deburring process. For every pull and push process the workpiece edge is deburred. With the continuous push and pull movement the tool can be deburred to any desired angle. It is crucial that here a rotating deburring does not take place. On the other hand, a deburring in the longitudinal axis must take place. In this manner, any contours can be reconstructed with the entire tool which can be advantageously deburred through the push and pull movement.

The following process steps are particularly beneficial:
1. The spring-loaded extended blade meets the opening edge and begins the cutting-deburring.
2. The connected control surface causes the blade to retract, defines the form of deburring and limits the deburring movement to the longitudinal direction.
3. After successful deburring the blade goes along the neutral slip surface through the opening.

DRAWING LEGENDS

1 Bore rim
1a Bore upper edge
1b Bore lower edge
2 Blade
2a Blade
2b Blade 2' Blade
3 Main casting
4 Spring
5 Clamping screw
6 Cutting edge
6a Cutting edge
7 Control surface
8 Tool face
8a Tool face
9 Rubbing surface
10 Lead-in surface
11 Blade groove
11' Blade groove
12 Blade window
13 Direction of arrow (Index movement)
14 Direction of arrow
15 Direction of arrow
15a Direction of arrow
16 Contact point
17 Direction of arrow
18 Deburring
19 Workpiece
20 Longitudinal bore
21 Transverse bore
22 Direction of arrow
23 Bore outlet
24 Bore inlet
25 Flute
26 Bore outlet edge
27 Bore inlet edge (through hole)
28 Material section
29 Indexing angle
30 Neutral surface
31 Direction of arrow
32 Direction of arrow
33 Length
34 Length
35 Incline
36 Distance

The invention claimed is:

1. A method of deburring an edge of a workpiece comprising the steps of:
providing a cutting tool having a longitudinal axis,
providing a workpiece having an edge,
reciprocating the cutting tool parallel to the longitudinal axis of the cutting tool to remove material from the edge of the workpiece,
indexing the cutting tool to a different location on the edge of the workpiece, and
repeating the reciprocating step.

2. The method of claim 1 wherein the step of indexing the cutting tool comprises rotating the cutting tool about the longitudinal axis of the cutting tool.

3. The method of claim 2 wherein the cutting tool is rotated a predetermined index angle.

4. The method of claim 3 wherein the predetermined index angle is about 0.5 degrees to about 2 degrees.

5. The method of claim 1 wherein the step of indexing the cutting tool comprises translating the cutting tool perpendicularly to the longitudinal axis of the cutting tool.

6. The method of claim 5 wherein the cutting tool is translated a predetermined index linear distance.

7. The method of claim 1 wherein the cutting tool has a tool body and a cutting blade movably mounted in the tool body for movement perpendicular to the longitudinal axis of the cutting tool between an extended cutting position and a retracted non-cutting position, wherein the cutting blade is spring biased towards the extended cutting position.

8. The method of claim 7 wherein the reciprocating step comprises:
thrusting the cutting tool towards the workpiece until the cutting blade contacts the workpiece,
further thrusting the cutting tool towards the workpiece such that the workpiece overcomes the spring bias of the cutting blade and urges the cutting blade to the retracted non-cutting position,
further thrusting the cutting tool toward the workpiece until the cutting blade moves out of contact with the workpiece at which time the spring bias of the cutting blade moves the cutting blade into the extended cutting position, and
drawing the cutting tool away from the workpiece to remove material from the edge of the workpiece with the cutting blade until such time as the workpiece overcomes the spring bias of the cutting blade and urges the cutting blade to the retracted non-cutting position.

9. The method of claim 7 wherein the workpiece has a first edge and a second opposite edge, and wherein the reciprocating step comprises:
thrusting the cutting tool towards the workpiece until a first end of the cutting blade contacts the workpiece,
further thrusting the cutting tool toward the workpiece to remove material from the first edge of the workpiece with the first end of the cutting blade, further thrusting the cutting tool towards the workpiece such that the workpiece overcomes the spring bias of the cutting blade and urges the cutting blade to the retracted non-cutting position, further thrusting the cutting tool toward the workpiece until the cutting blade moves out of contact with the workpiece at which time the spring bias of the cutting blade moves the cutting blade to the extended cutting position, and drawing the cutting tool away from the workpiece to remove material from the second edge of the workpiece with a second opposite end of the cutting blade until such time as the workpiece overcomes the spring bias of the cutting blade and urges the cutting blade to the retracted non-cutting position.

10. The method of claim 1 wherein the cutting tool removes material from the edge of the workpiece as the cutting tool is thrust toward the workpiece.

11. The method of claim 1 wherein the cutting tool removes material from the edge of the workpiece as the cutting tool is drawn away from the workpiece.

12. The method of claim 7 wherein the cutting blade includes a lead-in surface, a sliding surface, a control surface, a cutting edge, and a cutting face, as viewed from a forward end of the cutting blade to a rearward end of the cutting blade.

13. The method of claim 12 wherein the cutting edge is arch-shaped.

14. The method of claim 7 wherein the cutting blade includes a first cutting face, a first cutting edge, a first control surface, a common sliding surface, a second control surface, a second cutting edge, and a second cutting face, as viewed from a forward end of the cutting blade to a rearward end of the cutting blade.

15. The method of claim 14 wherein the cutting edges are arch-shaped.

* * * * *